United States Patent
Lukács

(10) Patent No.: US 10,965,477 B2
(45) Date of Patent: Mar. 30, 2021

(54) ENHANCED POWER-SAVING MODE IN SYSTEMS PROVIDING POWER OVER TRANSMISSION LINES

(71) Applicant: Silicon Laboratories Inc., Austin, TX (US)

(72) Inventor: Miklós Lukács, Budapest (HU)

(73) Assignee: Silicon Laboratories Inc., Austin, TX (US)

( * ) Notice: Subject to any disclaimer, the term of this patent is extended or adjusted under 35 U.S.C. 154(b) by 269 days.

(21) Appl. No.: 15/940,455

(22) Filed: Mar. 29, 2018

(65) Prior Publication Data
US 2019/0305974 A1    Oct. 3, 2019

(51) Int. Cl.
*G06F 1/26*    (2006.01)
*H04L 12/10*    (2006.01)

(52) U.S. Cl.
CPC .............. *H04L 12/10* (2013.01); *G06F 1/26* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 8,595,531 B2* | 11/2013 | Thyni | ................. | G06F 1/325 713/323 |
| 2006/0259798 A1* | 11/2006 | Stanford | ................. | H04L 12/10 713/300 |
| 2007/0085675 A1* | 4/2007 | Darshan | ................. | H04L 69/24 340/538.11 |
| 2012/0212209 A1* | 8/2012 | Schindler | ................. | H04L 12/10 323/364 |
| 2014/0129854 A1* | 5/2014 | Diab | ................. | H04L 12/40045 713/310 |

(Continued)

OTHER PUBLICATIONS

Linear Technology, "LT4294 IEEE 802.3bt PD Interface Controller," 2017, pp. 1-14.

(Continued)

*Primary Examiner* — Zahid Choudhury
(74) *Attorney, Agent, or Firm* — Zagorin Cave LLP

(57) ABSTRACT

A technique establishes a powered link over a transmission line. The technique includes, after determination of a power level to be provided to a powered device coupled to the transmission line, providing an output signal having a power-saving signal level to the transmission line until detecting an event. The event may be a power-up or a disconnect of the powered device. The technique may further include changing the output signal from the power-saving signal level to the powered-mode output signal level. The technique may include providing the powered-mode output signal level until detecting a disconnect of the powered device. The technique may include providing a second output signal to an additional powered device coupled to an additional transmission line until detecting the event. The technique may include changing the second output signal from the power-saving signal level to a second powered-mode output signal level synchronous with changing the output signal.

20 Claims, 7 Drawing Sheets

(56) References Cited

U.S. PATENT DOCUMENTS

| | | | |
|---|---|---|---|
| 2014/0195831 A1* | 7/2014 | Hamdi | G06F 1/3296 |
| | | | 713/320 |
| 2015/0006930 A1* | 1/2015 | Antonio | G06F 1/263 |
| | | | 713/323 |
| 2016/0204949 A1* | 7/2016 | Theunissen | H05B 47/18 |
| | | | 307/1 |
| 2019/0319483 A1* | 10/2019 | Peker | H04L 12/10 |

OTHER PUBLICATIONS

Guerra, M., "Everything You Need to Know About the New PoE Standard," Electronic Design, Feb. 16, 2017, 7 pages.

Veracity UK Ltd., "PoE Explained," Version 1.1, Dec. 11, 2008, pp. 1-14.

Amplicon, "Power over Ethernet technology for industrial Ethernet networks," White Paper, downloaded from https://www.amplicon.com/infoilearning-white-papers.cfm, Jan. 24, 2018, 8 pages.

Wikipedia, "Power over Ethernet," downloaded from https://en.wikipedia.org/w/index.php?title=Power_over_Ethernetoldid=820274965, Feb. 2, 2018, 11 pages.

Ibex, "Power Over Ethernet (PoE)—Electronic Product Design," downloaded from http://www.electronic-products-design.com/geek-area/electronics/ethernet/power-over-ethernet-poe, Jan. 24, 2018, 8 pages.

Silicon Laboratories, "Fully-Integrated IEEE 802.3—Complaint PoE PD Interface and Low-EMI Switching Regulator," Si3402-B, Rev. 1.1, Dec. 2016, 22 pages.

Silicon Laboratories, "Quad IEEE 802.3AT PoE PSE Controller," Si3454, Rev. 1.1, Sep. 2015, 57 pages.

Silicon Laboratories, "Single-Port IEEE 802.3AT PoE/PoE+ PSE Interface," Rev. 1.0, Nov. 2011, 24 pages.

Silicon Laboratories, "Power Management Controller," Confidential Rev. 1.1, Jun. 2015, 52 pages.

Guo, J., et al., "TPS23752 Maintain Power Signature Operation in Sleep Mode," Texas Instruments, Application Report SLVA588, Apr. 2013, 13 pages.

* cited by examiner

ENHANCED POWER-SAVING MODE IN SYSTEMS PROVIDING POWER OVER TRANSMISSION LINES

BACKGROUND

Field of the Invention

The invention relates to electronics systems, and more particularly to electronics systems that communicate power over transmission lines.

Description of the Related Art

In a conventional system that provides power over transmission lines (e.g., Power over Ethernet application), power sourcing equipment provides electric power using cabling including at least two conductors (e.g., Ethernet cabling) that concurrently communicates data between power sourcing equipment and a powered device. Power sourcing equipment provides power to the powered device after detecting presence of the powered device coupled to the transmission line and negotiating a power level to be provided to the powered device. The conventional power-saving mode in systems that provide power over transmission lines is not power efficient, is characterized by slow turn on of the powered device, and is unable to synchronize turn on of multiple powered devices. Accordingly, improved techniques for providing power to devices over transmission lines are desired.

SUMMARY OF EMBODIMENTS OF THE INVENTION

In at least one embodiment, a method for establishing a powered link over a transmission line includes, after determination of a power level to be provided to a powered device coupled to the transmission line, providing an output signal having a power-saving signal level to the transmission line until detecting an event. The event may be a power-up event and the method may further include changing the output signal from the power-saving signal level to the powered-mode output signal level. The method may include providing the powered-mode output signal level as the output signal until detecting a disconnect of the powered device from the transmission line. The method may include providing a second output signal to an additional powered device coupled to an additional transmission line until detecting the event. The second output signal may have the power-saving signal level until detecting the event. The method may include changing the second output signal from the power-saving signal level to a second powered-mode output signal level determined according to a second power level to be provided to the additional powered device. The changing of the second output signal may be synchronous with the changing of the output signal. The transmission line may be an Ethernet cable.

In at least one embodiment, a system for delivering power over a transmission line comprising at least two conductors includes a device. The device includes a sensing circuit configured to sense power delivered by the device using the transmission line. The device includes a power converter configured to deliver power via an output signal. The device includes a controller configured to configure the power converter to provide a power-saving signal level as the output signal until detecting an event after determination of a power level to be provided to a powered device coupled to the transmission line. A magnitude of the power-saving signal level is less than a magnitude of a powered-mode output signal level. The powered-mode output signal level is determined according to the power level.

In at least one embodiment, a method for establishing a powered link over a transmission line includes providing a power signature by a powered device to the transmission line in response to an input signal varying according to a first event sequence. The input signal is received from the transmission line. The method includes operating the powered device in a power-saving mode in response to the input signal having a power-saving signal level. The method includes operating the powered device in a powered mode in response to the input signal having a powered-mode signal level. The powered-mode signal level is determined based on the power signature.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
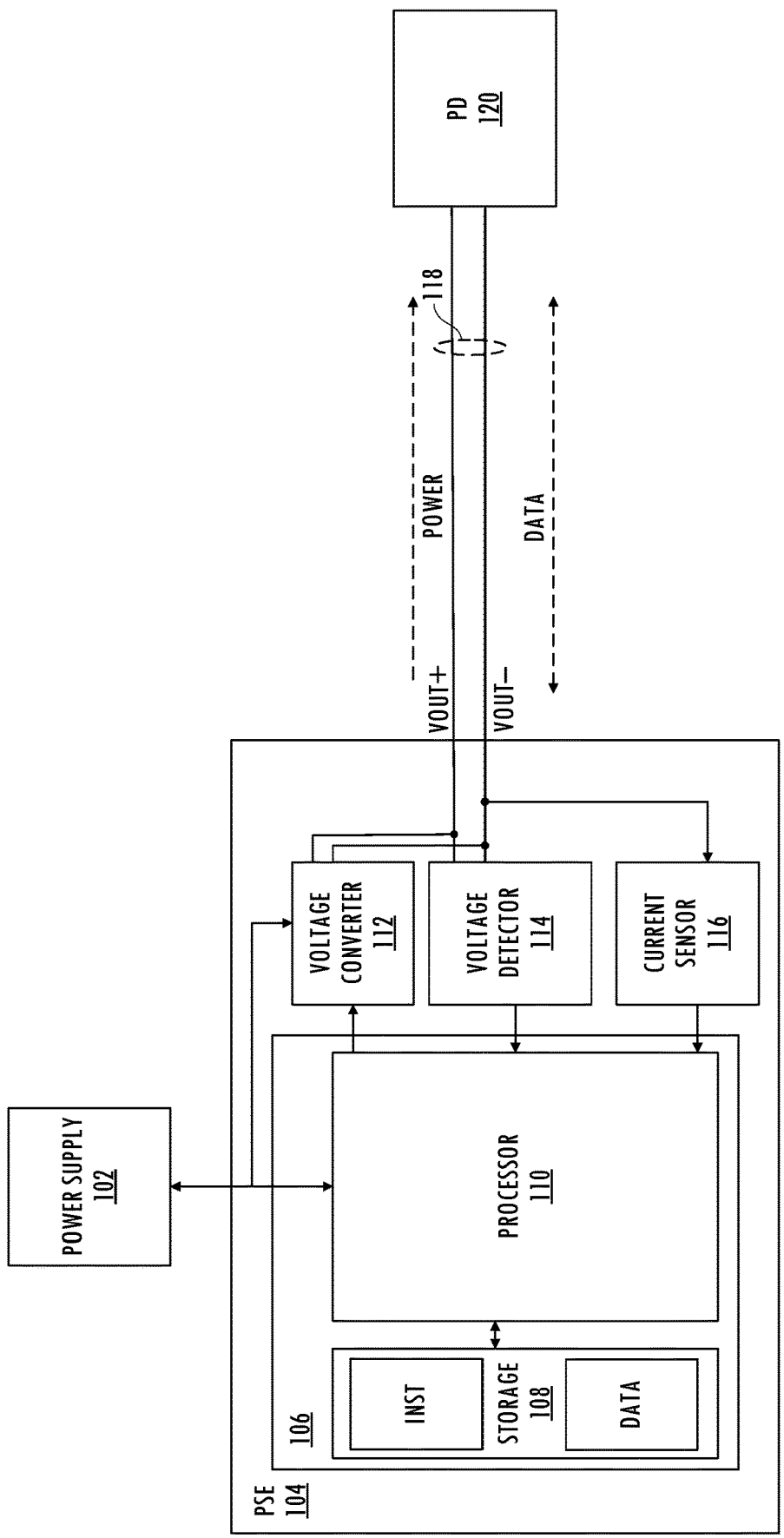
FIG. 1 illustrates a functional block diagram of an exemplary system including a power sourcing entity coupled to a powered device.

Referring to FIG. 1, in a typical application, power sourcing entity 104 (e.g., a power sourcing entity compliant with an Institute of Electrical and Electronics Engineers (IEEE) Standard 802.3, which defines a physical layer and data link layer media access control for wired Ethernet) provides power to powered device 120 using transmission line 118, which is a cable including at least two conductors (e.g., twisted pair cable, coaxial cable, or other transmission line including at least two conductors). Power-sourcing equipment 104 receives power from power supply 102 and includes controller 106, voltage converter 112, voltage detector 114, and current sensor 116. Controller 106 includes processor 110 configured to execute instructions stored in storage 108 to control power output to transmission line 118 based on voltages and currents sensed on transmission line 118. Powered device 120 receives power from power sourcing equipment 104 (e.g., a hub, network switch, router, or other node or infrastructure device) over transmission line 118 and communicates data to power sourcing entity 104 over transmission line 118.

Figure 2:
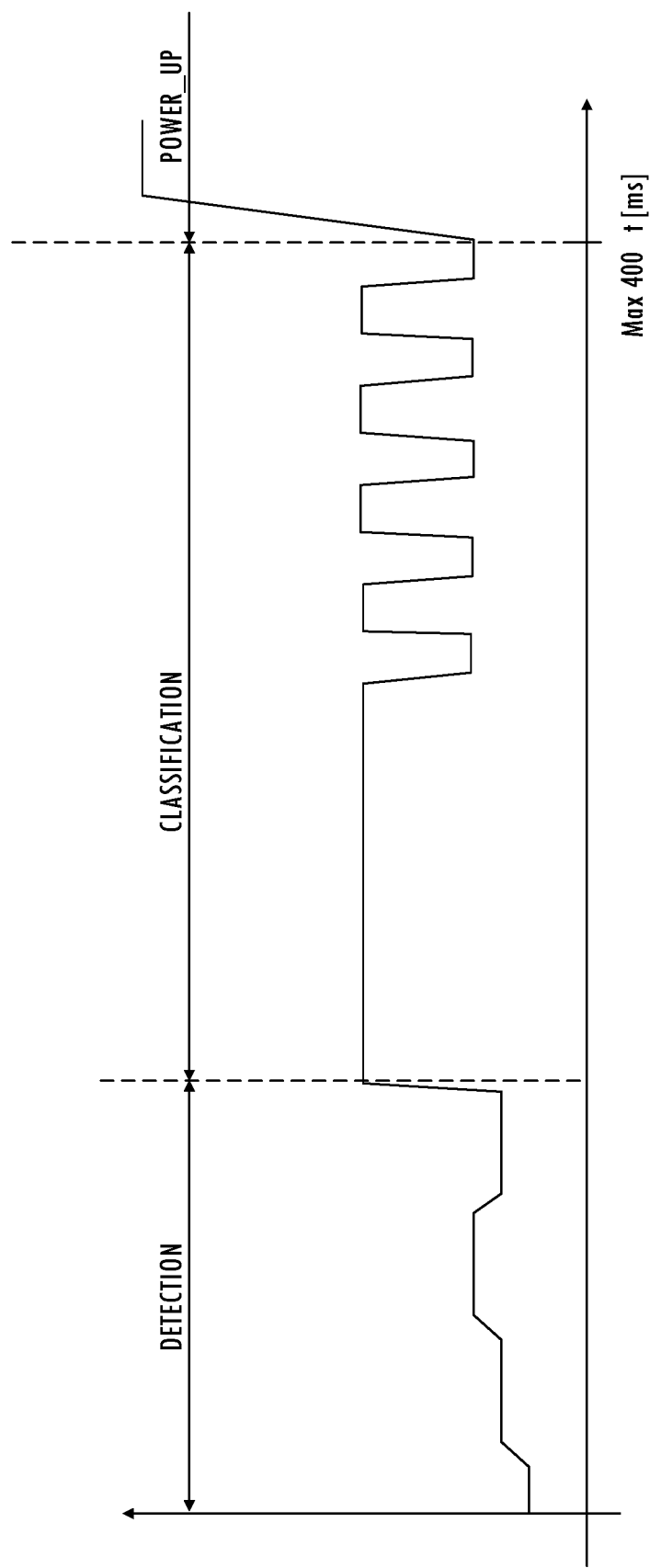
FIG. 2 illustrates an exemplary signal timing diagram for an output voltage during conventional operation of the system of FIG. 1.
Figure 3:
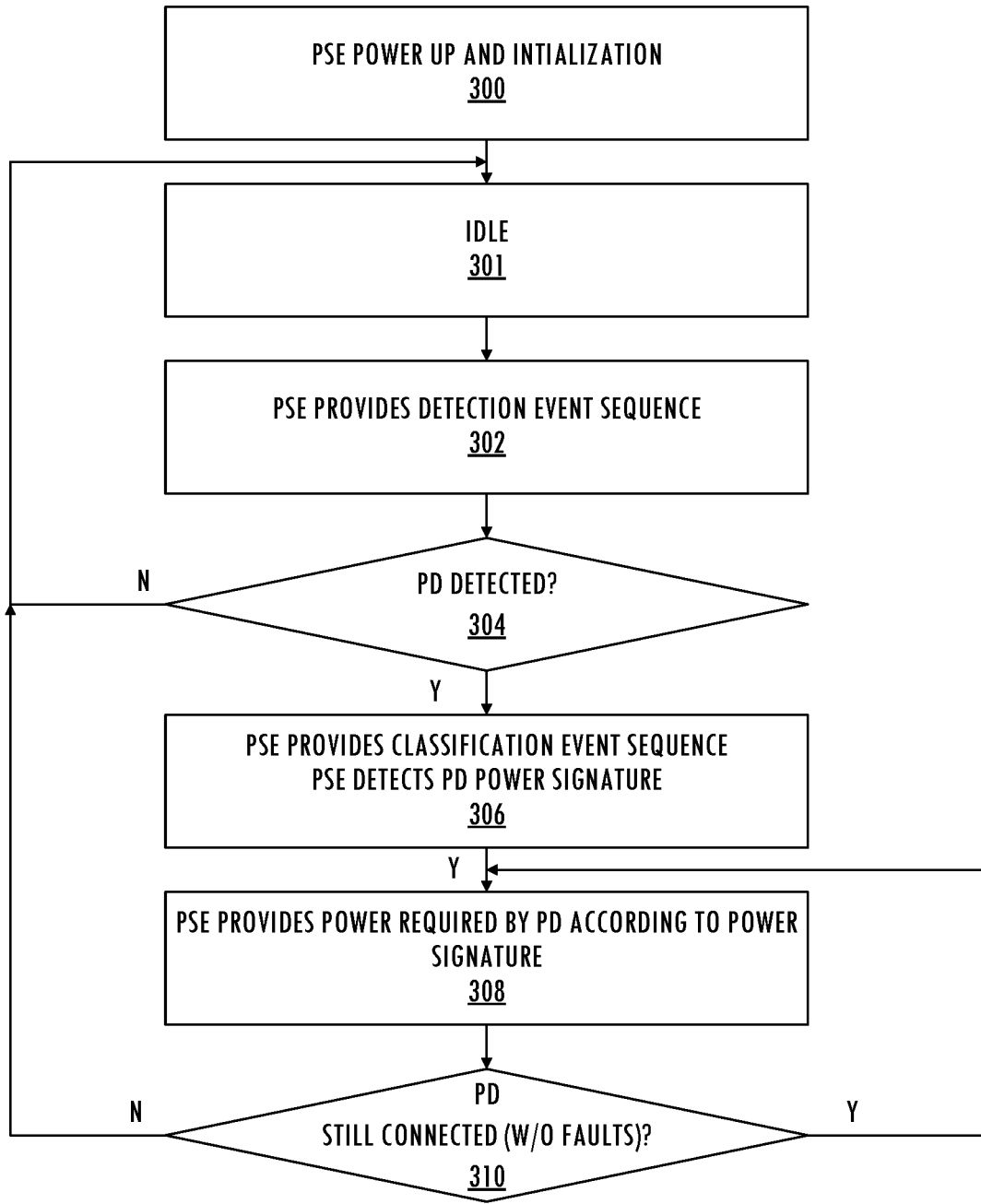
FIG. 3 illustrates exemplary information and control flows for conventional operation of the system of FIG. 1.
Figure 4:
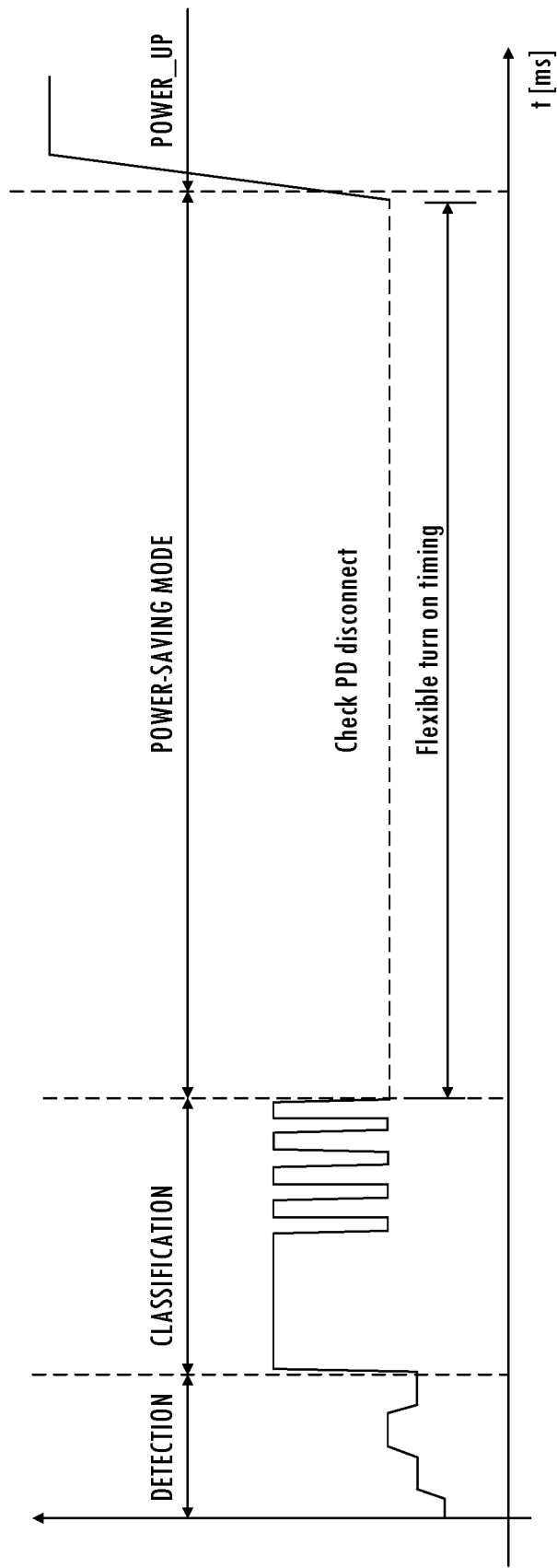
FIG. 4 illustrates a timing diagram for enhanced operation of the exemplary system of FIG. 1, consistent with at least one embodiment of the invention.

Referring to FIGS. 1-3, after power up and initialization, power sourcing equipment 104 may detect, classify, and provide power to powered device 120 by providing a predetermined sequence of voltages on a port (e.g., VOUT+ and VOUT−) coupled to powered device 120 via transmission line 118. For example, after power up and initialization (300), power sourcing equipment 104 enters an idle state (301) followed by a detection state that senses a predetermined nominal signature resistance (e.g., 25 k Ω) in parallel with up to a predetermined amount of capacitance. Powered device 120 couples its detection signature circuit across two conductors of transmission line 118 (e.g., conductors of transmission line 118 coupled to VOUT+ and VOUT−). Power sourcing equipment 104 provides a detection event sequence to transmission line 118 (302). Meanwhile, current sensor 116 monitors the current consumption to detect presence of powered-up device 120 coupled to transmission line 118. The detection signature circuit of powered device 120 coupled across VOUT+ and VOUT− creates a resistive signature that causes power sourcing equipment 104 to detect a valid powered device. For example, power sourcing equipment 104 evaluates the presence of a valid powered device 120 by making at least two measurements using port voltage values that create at least a 1V voltage drop. Power sourcing equipment 104 calculates an effective resistance from two or more measurements made during the detection mode. An exemplary detection event sequence starts with output voltage VOUT equal to 0 Volts, and then varies VOUT from 4 V for 20 ms to 8 V for 20 ms and then back to 4 V for 50 ms, although other detection event sequences may be used. If power sourcing equipment 104 detects a signature resistance in a predetermined range (e.g., 17 kΩ to 29 kΩ) (304), then power sourcing equipment 104 enters a classification state (306). If power sourcing equipment 104 fails to detect a resistance of the powered device in the predetermined range (304), power sourcing equipment may return to the idle state (301) and periodically repeat the detection event sequence (302).

In the classification state, power sourcing equipment 104 interrogates powered device 120 to determine its power requirement and provides an indication to powered device 120 of power allocated to powered device 120 (306). Although different techniques may be used to determine the power requirements of a powered device, an embodiment of power sourcing equipment 104 provides a pulse of predetermined classification voltage with a predetermined current limit (e.g., 18 V and 75 mA, respectively) for a predetermined time (e.g., 30 ms) across VOUT+ and VOUT−. In another embodiment, power sourcing equipment 104 repeats the pulse once. For example, a two-event classification event sequence outputs the pulse of the classification voltage and mark voltage twice with a predetermined amount of time at the mark voltage between the two pulses (e.g., a classification voltage between 15.5 V and 20.5 V and a mark voltage between 7 V and 10 V). In general, the mark voltage is a voltage level that provides sufficient power to the powered device to maintain its classification state, and in systems implementing other protocols, the mark voltage may have a different name and different signal level range. Current sensor 116 of power sourcing equipment 104 senses a current on transmission line 118 during the pulse and classifies an expected power consumption of powered device 120 based on the sensed current and predetermined supported current ranges. If the sensed current does not fall within a supported current range, power sourcing equipment 104 indicates an error condition.

In at least one embodiment, after applying the classification probe voltage and measuring the classification signature current of powered device 120, power sourcing equipment 104 returns the output voltage (e.g., the voltage across VOUT+ and VOUT−) to a mark voltage range before applying another classification probe voltage or powering up powered device 120. Power sourcing equipment 104 may apply multiple (e.g., up to five events) before powering up powered device 120. Power sourcing equipment 104 provides a sequence of classification and mark events to powered device 120 that indicates the power allocated to powered device 120. Powered device 120 may present different class signatures during different events of the sequence to power sourcing equipment 104 to indicate the classification of powered device 120. Power sourcing equipment 104 may present different numbers of events in the sequence to powered device 120 to indicate that a power level requested by powered device 120 is unavailable, causing powered device 120 to operate in a power state lower than requested. However, note that the classification event sequences, sensed current range, and expected peak power consumption of a powered device may vary by application.

If power sourcing equipment 104 successfully classifies powered device 120 (306), power sourcing equipment 104 proceeds to power up powered device 120 after a last mark event of the classification event sequence within a predetermined period (e.g., less than 400 ms from the end of the detection event sequence). Power sourcing equipment 104 applies a signal level to VOUT+ and VOUT− based on the power level determined based on the power signature detected during classification or negotiated with powered device 120 (308) so long as power sourcing equipment 104 does not detect a fault (e.g., input under voltage lockout, overvoltage lockout, overcurrent, or other fault condition) or a disconnect event (310).

In an exemplary system (e.g., a conventional Power over Ethernet system compliant with the IEEE Standard 802.3), a power-saving mode provides limited power to powered device 120. For example, during a sleep mode, powered device 120 must consume a predetermined amount of current and must provide a maximum AC impedance. Powered device 120 generates a power signature having a particular duty cycle and standby power (e.g., a minimum DC current of 10 mA or a 10 mA pulsed current for at least every 75 ms in every 325 ms). Power sourcing equipment 104 detects that power signature and provides a power-saving signal level to powered device 120 that maintains a power connection between power sourcing equipment 104 and powered device 120 and prevents power sourcing equipment 104 from turning off. An exemplary conventional power-saving mode (e.g., a long maintain power signature mode) consumes a substantial amount of power (e.g., approximately 57 V×10 mA×75 ms/250 ms=170 mW per set of power sourcing equipment and powered device). The exemplary conventional power-saving mode consumes substantially more power than the enhanced power-saving mode described herein. Another exemplary conventional power-saving mode (e.g., short maintain power signature mode) consumes less power, but provides insufficient power to support enhanced sleep mode system level designs (e.g., enhanced sleep mode system level designs that require approximately 57 V×10 mA×7 ms/310 ms=12.9 mW per set of power sourcing equipment and powered device). For example, the short maintain power signature mode does not allow power sourcing equipment 104 to maintain hundreds of luminaries in a state that may power up near instantaneously in response to a power-up event. Instead, a power-up event is associated with a substantial latency (e.g., 100-200 ms delay) that may depend on system topology and processing speed of system components. Powered device 120 must manage its own low-power states and operational states and consumes power to create necessary current pulses to indicate that it is still operational to power sourcing equipment 104. In addition, the power up of pluralities of powered devices from that power-saving mode occurs asynchronously (e.g., 100-200 ms apart).

Figure 5:
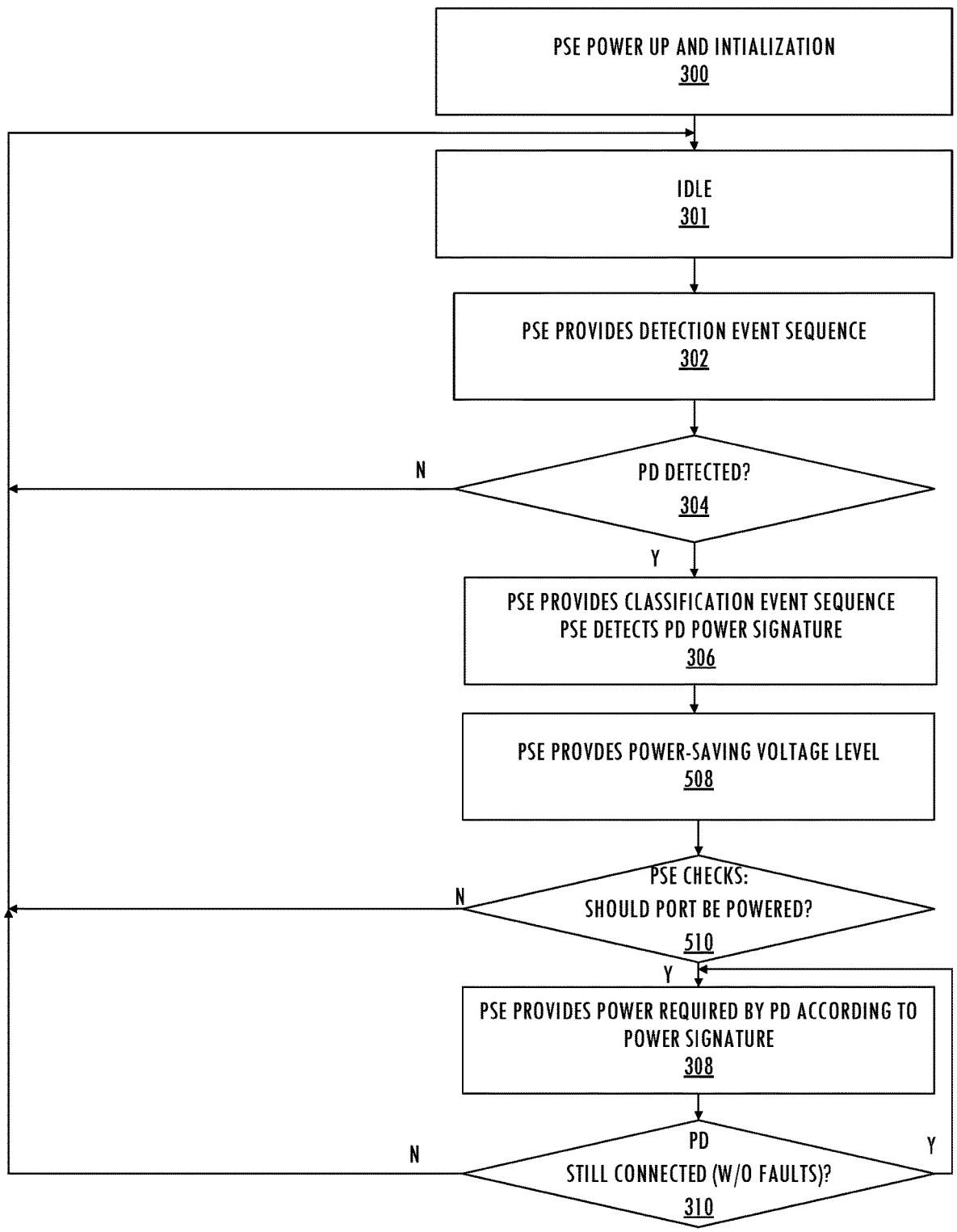
FIG. 5 illustrates information and control flows for enhanced operation of the exemplary system of FIG. 1, consistent with at least one embodiment of the invention.

Referring to FIGS. 1 and 5, in at least one embodiment, power sourcing equipment 104 implements an enhanced power-saving mode that indefinitely maintains a powered connection to at least one powered device 120 prior to powering up powered device 120. In at least one embodiment of a system, after power up and initialization (300), power sourcing equipment 104 enters an idle state (e.g., automatically or in response to an indication received from a host controller) (301) followed by a detection state. Then, power sourcing equipment 104 sends a detection event sequence over transmission line 118 (302). If power sourcing equipment 104 does not detect a powered device (304), power sourcing equipment 104 may return to the idle state (301) and periodically repeats sending the detection event sequence over transmission line 118. If power sourcing equipment 104 detects a powered device coupled to transmission line 118 (304), power sourcing equipment 104 sends a classification event sequence and detects a power signature of powered device 120 (306). Instead of powering up the powered device as in the conventional system described above, power sourcing equipment 104 provides a power-saving signal level (e.g., a power-saving voltage level that is less than a power level required by powered device 120) to powered device 120 (508). In at least one embodiment, during the enhanced power-saving mode, power sourcing equipment 104 provides a voltage level sufficient for powered device 120 to maintain its classification state for an unspecified period after a last event of a classification event sequence as the power-saving voltage level. In an exemplary Power over Ethernet system, the voltage level is the mark voltage level.

During the enhanced power-saving mode, power sourcing equipment 104 provides the power-saving voltage level (e.g., the mark voltage level) to powered device 120 until detecting a power-on event, a fault event, or a disconnect event. However, during the power-saving mode of operation, power sourcing equipment 104 may provide other voltage levels that are deemed safe for a powered device. For example, safe voltage levels may be determined based on a class of the powered device detected during the classification event sequence. A fault event or disconnect event may be determined based on sensing a current consumption of powered device 120 that falls outside a predetermined range (e.g., 250 µA to 4 mA). While providing the power-saving voltage level in the enhanced power-saving mode, power sourcing equipment 104 determines whether the port should be powered (510). If the powered device disconnects during the enhanced power-saving mode, power sourcing equipment 104 resets and returns to the idle state (301). If power sourcing equipment 104 detects a power-up event (510), power sourcing equipment 104 provides a power level determined based on the power signature detected during classification or negotiated with powered device 120 (308). Powered device 102 powers up near instantaneously from the enhanced power-saving mode. Note that the power provision in the enhanced power-saving mode does not require data communication via transmission line 118, unlike other power-saving modes of conventional systems. Power sourcing equipment 104 provides that power to powered device 120 until detecting a disconnect of the powered device or a fault condition (310). Note that other sequences of control flow that maintain data dependencies of FIG. 5 may be implemented consistent with the description herein.

Figure 6:
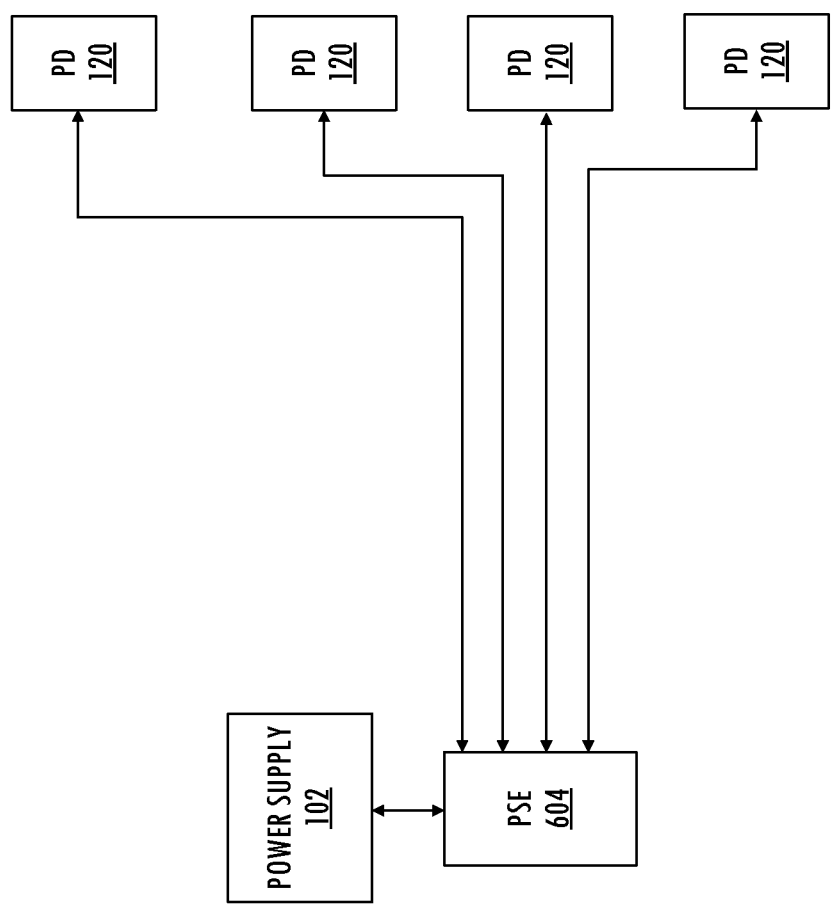
FIG. 6 illustrates a functional block diagram of an exemplary system including a multi-port power sourcing entity coupled to multiple powered devices.

Referring to FIG. 6, in at least one embodiment, power sourcing equipment 604 implements the enhanced power-saving mode. Power sourcing equipment 604 includes multiple ports for providing power over separate transmission lines to corresponding powered devices 120. Power sourcing equipment 604 may asynchronously detects, classifies, power requirements, and delivers sleep mode power to each of powered devices 120 coupled to a corresponding port of power sourcing equipment 604. After power sourcing equipment 604 detects, classifies, and configures the plurality of powered devices in the enhanced power-saving mode, power sourcing equipment 604 may then cause all powered devices 120 to power up at the same time, or according to a predetermined power-up sequence. Power sourcing equipment 604 may use a timer or other protocol to determine when to power up each of powered devices 120 from the enhanced power-saving mode.

Figure 7:
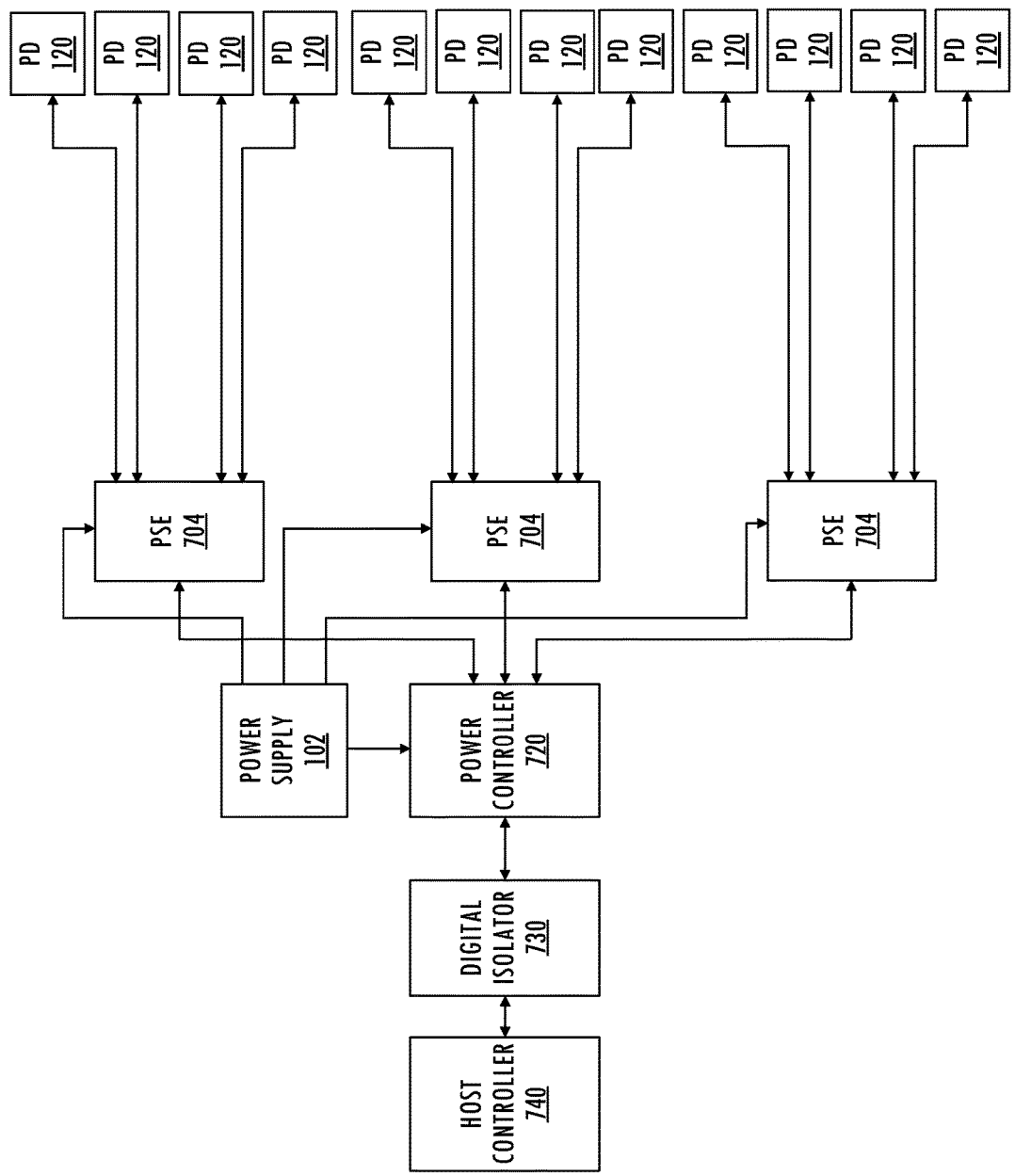
FIG. 7 illustrates a functional block diagram of an exemplary system including a plurality of multi-port power sourcing entities coupled to powered devices.

Referring to FIG. 7, in an exemplary Power over Ethernet application, each power sourcing equipment 704 includes multiple ports for providing power over transmission lines to a corresponding set of powered devices 120. Each power sourcing equipment 704 asynchronously detects, classifies, and delivers sleep mode power to each of powered devices 120 coupled to a port of a corresponding power sourcing equipment 704. Each power sourcing equipment 704 is controlled by power controller 720, which may be coupled to host controller 740 (e.g., using digital isolator 730 for devices having different power domains). After the plurality of power sourcing equipment 704 detect, classify, and configure corresponding pluralities of powered devices 120 in the enhanced power-saving mode, each power sourcing equipment 704 may then wait until it receives a power-on event from host controller 740. In response to receiving the power-on event from host controller 740, power controller 720 sends corresponding power-on events to each power sourcing equipment 704 to cause all powered devices 120 in the system to synchronously power up or to cause those powered devices 120 to power up according to a predetermined timing sequence. Powered devices 120 power up into normal operation from the enhanced power-saving mode near instantaneously and more quickly than powered devices that are powered up from power-saving modes of conventional systems. In an exemplary system, powered devices 120 are capable of operation within 1 ms after power sourcing equipment 704 turns on the power, although powered devices 120 may be otherwise limited by an inrush current specification (e.g., consuming only 15 W of power in the first 80 ms). The power provision in the enhanced power-saving mode does not require data communication via transmission line 118, unlike other power-saving modes of conventional systems. In an exemplary Power over Ethernet system, the enhanced power-saving mode consumes approximately 18 mW of power. Enhancements (e.g., providing an external power rail only for the enhanced power-saving mode) may further reduce that power consumption. A comparable system implementing a conventional long maintain power signature mode consumes approximately 170 mW. A conventional short maintain power signature mode in the comparable system consumes approximately 13 mW of power, which is not enough for powering an integrated circuit that monitors data to turn on the powered device. That integrated circuit requires approximately 40 mW of power.

In an exemplary lighting application, powered devices 120 are associated with individual lights and power sourcing equipment 704 detect and classify those lights prior to entering the enhanced power-saving mode. A light switch or other controller triggers power sourcing equipment 704 to turn on the lights near-instantaneously from the enhanced power-saving mode. A more complex controller manages timing and sequence of turning on or entering the enhanced power-saving mode of individual lights in one or more rooms (e.g., turning on particular lights for security purposes or entering the enhanced power-saving mode of particular lights for saving power).

Thus, an enhanced power-saving mode that reduces power consumption as compared to power-saving modes of conventional systems, eliminates the need for powered device to manage its low power and operational states, has a faster turn-on than the power-saving modes of conventional systems, and provides synchronized turn-on for multiple devices in systems powered over transmission lines has been described. The description of the invention set forth herein is illustrative and is not intended to limit the scope of the invention as set forth in the following claims. For example, while the invention has been described in an embodiment that uses a mark voltage level to provide power to powered devices in the enhanced power-saving mode, one of skill in the art will appreciate that the teachings herein can be utilized with other power-saving signal levels. In addition, while the invention has been described in an embodiment in which an Ethernet cable provides power to powered devices while communicating data between the powered devices and power sourcing equipment, one of skill in the art will appreciate that the teachings herein can be utilized with other types of nodes and power sourcing coupled to devices by different types of transmission lines including at least two conductors. Variations and modifications of the embodiments disclosed herein, may be made based on the description set forth herein, without departing from the scope of the invention as set forth in the following claims.

What is claimed is:

1. A method for establishing a powered link over a transmission line comprising:
    after determination of a power level to be provided to a powered device coupled to the transmission line, providing, by a power sourcing equipment, an output signal having a power-saving signal level, to the transmission line until detecting an event,
    wherein the power-saving signal level is less than a powered-mode output signal level determined according to the power level, the power-saving signal level is provided during a power-saving mode of the powered device, and the power-saving signal level is sufficient for the powered device to maintain its classification state after a last event of a classification event sequence, and
    wherein the powered-mode output signal level is provided during a powered mode of the powered device.

2. The method, as recited in claim 1, wherein the event is a power-up event, the method further comprising:
    changing, by the power sourcing equipment, the output signal from the power-saving signal level to the powered-mode output signal level.

3. The method, as recited in claim 2, further comprising:
    providing, by the power sourcing equipment, the powered-mode output signal level as the output signal until detecting a disconnect of the powered device from the transmission line.

4. The method, as recited in claim 2, further comprising:
    providing a second output signal to an additional powered device coupled to an additional transmission line until detecting the event, the second output signal having the power-saving signal level until detecting the event; and
    changing the second output signal from the power-saving signal level to a second powered-mode output signal level determined according to a second power level to be provided to the additional powered device, the changing of the second output signal being synchronous with the changing of the output signal.

5. The method, as recited in claim 1, wherein the event is a disconnect event, the method further comprising:
    changing the output signal from the power-saving signal level to vary according to a first event sequence.

6. The method, as recited in claim 1, wherein the power-saving signal level is sufficient for the powered device to maintain its classification state for an unspecified period after the last event of the classification event sequence.

7. The method, as recited in claim 1, further comprising:
    after detecting the powered device coupled to the transmission line, determining the power level to be provided to the powered device based on power consumed by the powered device in response to a sequence of signal levels of the output signal.

8. The method, as recited in claim 1, further comprising:
    detecting the powered device comprising:
        varying a voltage of the output signal according to a first event sequence;
        sensing a predetermined nominal signature resistance in parallel with at most a predetermined capacitance; and
        wherein the powered device is detected if the predetermined nominal signature resistance is in a predetermined resistance range.

9. The method, as recited in claim 1, further comprising:
    determining the power level comprising:
        sensing a current on the transmission line while varying a voltage of the output signal according to a first event sequence; and
        determining the power level based on the sensed current and at least one predetermined current range.

10. The method, as recited in claim 9, wherein the power-saving signal level is a voltage level sufficient for the powered device to maintain a classification state of the powered device previously determined during classification.

11. The method, as recited in claim 1, wherein the power-saving signal level is a voltage level in a first range of voltages that maintain the powered device in a classification state and the powered-mode output signal level is a second voltage level in a second range of voltages that support normal operation of the powered device.

12. The method, as recited in claim 1, wherein the transmission line is an Ethernet cable.

13. A system for delivering power over a transmission line comprising at least two conductors, the system comprising:
    a power sourcing equipment comprising:
        a sensing circuit configured to sense power delivered by the power sourcing equipment using the transmission line;

a power converter configured to deliver power via an output signal; and a controller configured to:

after determination of a power level to be provided to a powered device coupled to the transmission line, configure the power converter to provide a power-saving signal level as the output signal until detecting an event, wherein a first magnitude of the power-saving signal level is a voltage level less than a second magnitude of a powered-mode output signal level, the power-saving signal level is sufficient for the powered device to maintain its classification state after a last event of a classification event sequence, and the powered-mode output signal level is determined according to the power level.

14. The system, as recited in claim 13, wherein the controller is further configured to:

configure the power converter to provide the output signal varying according to a first event sequence; and configure the power converter to provide the output signal varying according to a second event sequence in response to detection of the powered device using the first event sequence.

15. The system, as recited in claim 13, wherein the transmission line is an Ethernet cable.

16. The system, as recited in claim 13, wherein the controller is further configured to:

configure the power converter to change the output signal from the power-saving signal level to the powered-mode output signal level in response to the event being a power-up event and to provide the powered-mode output signal level as the output signal until the power sourcing equipment detects a disconnect event.

17. The system, as recited in claim 16, wherein the power sourcing equipment further comprises:

a second power converter configured to deliver power via a second output signal, and wherein the controller is further configured to:

configure the second power converter to provide the second output signal to an additional powered device coupled to an additional transmission line until detecting the event, the second output signal having the power-saving signal level until detecting the event; and change the second output signal from the power-saving signal level to a second powered-mode output signal level corresponding to a second power level of the additional powered device, the change of the second output signal being synchronous with the change of the output signal from the power-saving signal level to the powered-mode output signal level.

18. The system, as recited in claim 13, wherein while the output signal has the power-saving signal level, the powered device is in a power-saving mode.

19. The system, as recited in claim 16, wherein the controller comprises:

a processor; and software stored in a storage element coupled to the processor, the software being executable by the processor to, after the determination of the power level, configure the power converter to provide the output signal having the power-saving signal level until detecting the event.

20. A method for establishing a powered link over a transmission line comprising:

receiving an input signal from the transmission line by a powered device;

providing a power signature by the powered device to the transmission line in response to the input signal varying according to a first event sequence; and after providing the power signature, selectively operating the powered device in a power saving mode or a powered mode in response to the input signal having a power saving signal level or a powered-mode signal level, respectively, wherein the powered-mode signal level is determined based on the power signature and the power-saving signal level is sufficient for the powered device to maintain its classification state after a last event of a classification event sequence.

* * * * *